Feb. 27, 1968  A. PIAROTTO  3,370,871
DEVICE FOR JOINING PANELS, IN PARTICULAR WOODEN PANELS
IN THE MANUFACTURE OF COMPOUND FURNITURE
Filed Aug. 20, 1965  4 Sheets-Sheet 1
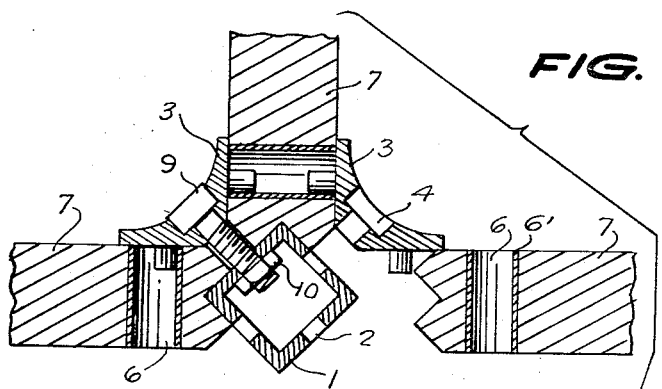
FIG. 1.
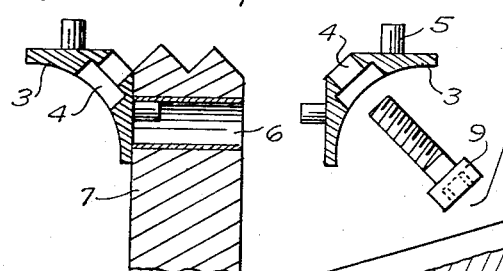
FIG. 2.
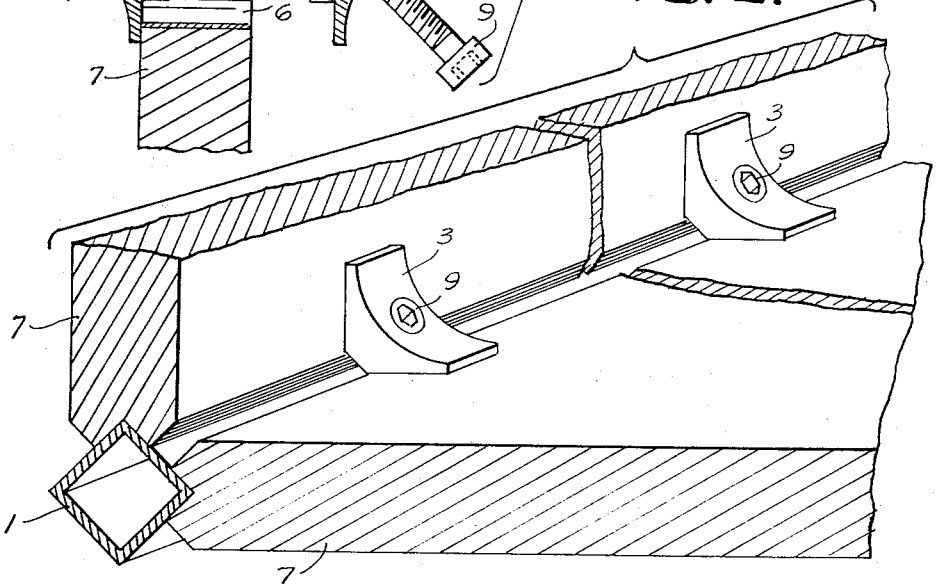
FIG. 3.
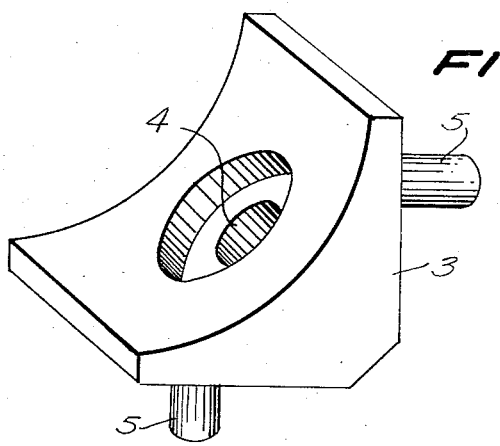
INVENTOR.
AMPELIO PIAROTTO,
BY Kimmel, Crowell & Weaver.
ATTORNEYS Feb. 27, 1968  A. PIAROTTO  3,370,871
DEVICE FOR JOINING PANELS, IN PARTICULAR WOODEN PANELS
IN THE MANUFACTURE OF COMPOUND FURNITURE
Filed Aug. 20, 1965  4 Sheets-Sheet 2

INVENTOR.
AMPELIO PIAROTTO,
BY Kimmel, Crowell & Weaver
ATTORNEYS.

United States Patent Office 3,370,871
Patented Feb. 27, 1968

3,370,871
DEVICE FOR JOINING PANELS, IN PARTICULAR WOODEN PANELS IN THE MANUFACTURE OF COMPOUND FURNITURE
Ampelio Piarotto, Campocroche Mirano, Venice, Italy
Filed Aug. 20, 1965, Ser. No. 481,381
10 Claims. (Cl. 287—20.92)

ABSTRACT OF THE DISCLOSURE

A panel joint having an elongated support on regular cross section, for joining the edges of two or more panels having angularly related surfaces by means of a prismatic one-piece clamping element having two planar surfaces which would intersect to form a dihedral with pins extending therefrom for engagement in apertures in the panels and a fastener for securing the clamping element to the elongated support is disclosed.

---

This invention relates to a process for joining panels in particular wooden panels of compound furniture and a device for accomplishing this process.

For joining compound furniture, it is common knowledge that wooden panels, plates or boards may be joined together by means of mechanical parts made up, as a rule, of devices which, beside their complexity and hence the considerable time required to join the panels, do not effectively secure a stable fixed angular relation between the panels thus joined.

The problem of providing a panelling joint to which insures a perfectly fitted fixed angular assemblage, and which may be rapidly assembled to form a solid structure in a simple and economical manner, is solved by the present invention.

According to the instant invention the joint between panels (plates, boards, etc.) is formed by making the diagonal planes of a symmetrical connecting tube, or an equivalent elongate support member, coincide with the median planes of the panels to be united. The panels to be assembled are rigidly secured against the tube at their juncture.

Along the joining sides, the panels are previously shaped in accordance with a profile accurately accommodate and complementarily comate with the corresponding edges of a square tube or other symmetrical support.

Shaped angle-irons provided with fixation pins and which are inserted in apertures bored along the edge of the dihedron formed by the panels, their number obviously depending on the joint length.

Successively, a bolt is inserted in each angle-iron which is passed through a corresponding hole in the tube or other support and is tightened with a nut in order to assemble rigidly the various joining elements.

Since the contact surfaces are perfectly co-planar, the precision of the dihedral angle selected for the joint is rigorously insured. The assembling operation (and of course, if necessary, dismantling) is very fast and the solid joining of the structure is thus secured by simple means and with considerable economic advantage.

Special hinges are provided which may be secured to the tubular joining elements of the invention. These special hinges may be used to connect movable panels such as shutters to compound furniture in a way which will permit either side of the panel or shutter to be shown at will without altering the structure of the various panels in any way.

Indeed, each of the two fixation hinges of such a panel shutter is shaped in such a way that the fixed part accommodates the pivot in a manner which allows the reversible panel to rotate. Each of the special fixation hinges is rigidly and directly fixed to the connecting tubular element of the various panels which comprise the joints and only abuts on the ends of the fixed panels.

The movable leaf of the hinge to be applied to the shutter is comprised of a small metal block provided with a pair of alternate bores or seats for selectively receiving the fixed pivot; the utilization of either seat being subject to the choice of the shutter face to be exposed.

Thus, when the special hinge described is fixed in pairs to the shutter or reversible panel, the panel may be rapidly secured in any embrasure of the compound furniture without altering the structure of the panels so secured.

Further, this hinge makes it possible to show either surface of the shutter depending upon which of the two seats of the movable part of the hinge receives the pivot of the fixed leaf of the hinge. Either surface of the shutter may be shown by merely rotating the shutter 180°.

For a better understanding of my invention, reference is made in the following description to the accompanying drawings wherein:

FIGURE 1 is an exploded view, illustrated in cross-section of a joint of four panels at 90°, of which two are already fixed and two in the process of being fitted.

FIGURE 2 is an axonometric view of a two-panel joint.

FIGURE 3 is an axonometric view of a connecting angle-iron.

Figure 4:
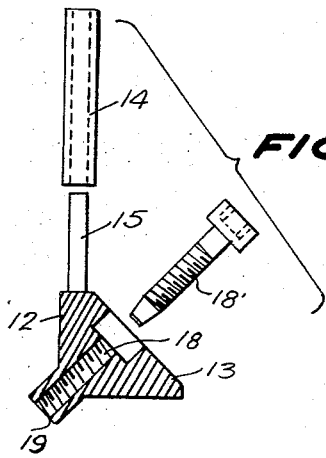
FIGURE 4 is an exploded inside elevation partly in section disclosing a special hinge for pivoted panels of compound furniture according to the invention.

As clearly appears from the drawings, the essential element of the joint is the metallic square tube designated by 1 and provided with a plurality of holes 2 corresponding to the tightening points to the panels.

The typical position of the tube with diagonal planes coinciding with the median planes of the panels 7 is clearly evident in the drawings. In fact, as seen in FIGURE 1, the diagonals of the square section of the tube form median axes of the panels.

The panels to be assembled on the side intended for joining are, so formed as to provide a joining surface complementary to that of the tube, so that when fitted perfect adherence of tube to panels is secured. The panels are provided with bores 6 having metallic liners 6' into between which the pins 5 of the angle-iron 3 are inserted. The angle-iron 3 has two flat surfaces resting against the panels and a connecting curved surface drilled at the center 4 in order to allow passage of a frictional fastener such as a bolt 9 which, after extending through the hole 2 of the tube is secured by tightening nut 10. As it appears, the bolts axis lies in the panel bisecting plane.

Thus a substantially perfect assemblage of the panels is achieved, while the pins 5 inserted into the holes 6 preclude slipping among the various assembled elements and there is thus provided a uniform distribution of stress.

As a modification of the tube, a full section shape with threaded holes at the connecting points may be used.

Figure 10:
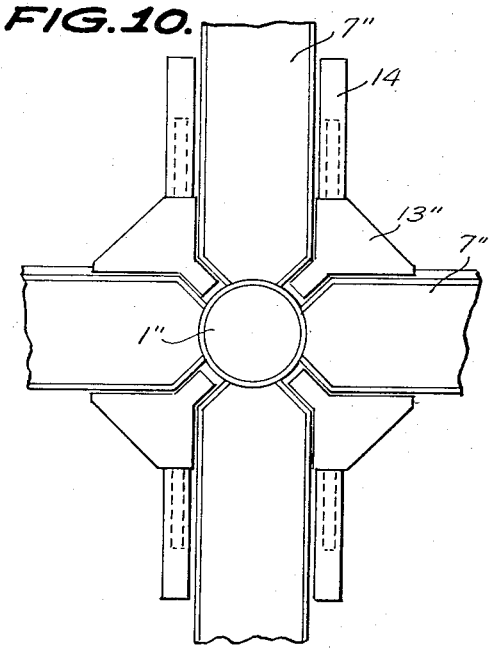
Figure 11:
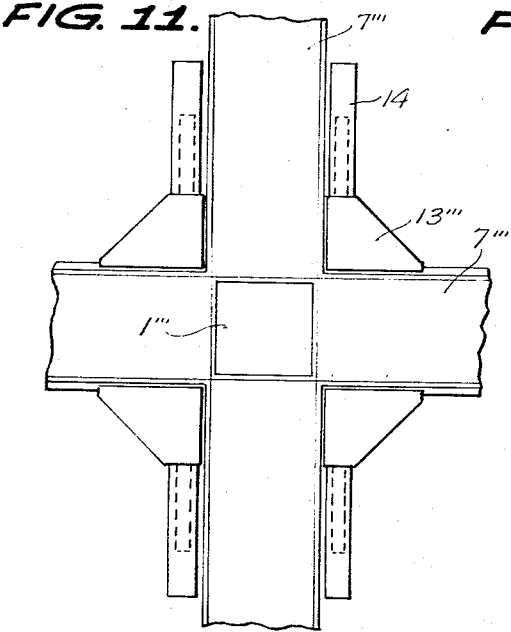
Figure 12:
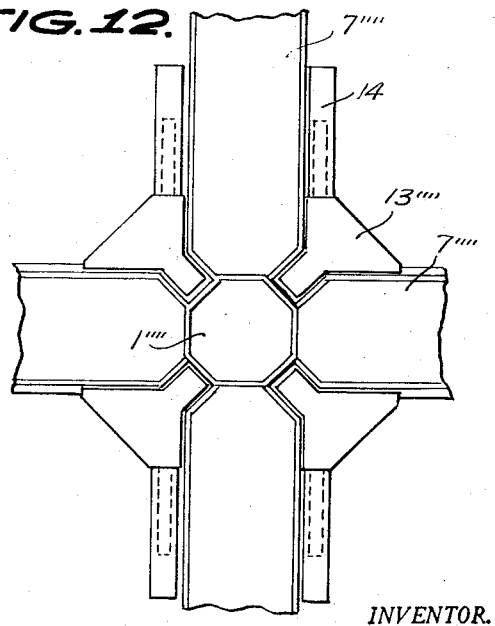

The tube may also be circular in cross-section as shown at 1″ in FIGURE 10, cruciform as shown at 1′ in FIG- URE 9, octagonal as shown at 1'''' in FIGURE 12 or of any other suitable symmetrical shape.

The width of the angle-iron should be sufficient to allow ample space for the bolt hole. In a modified form the angle-iron may have an appreciable thickness and include a flat surface having bores to permit passage of the bolts. This is particularly advantageous when applied to bed furniture in the angular joints of the frame.

Figure 8:
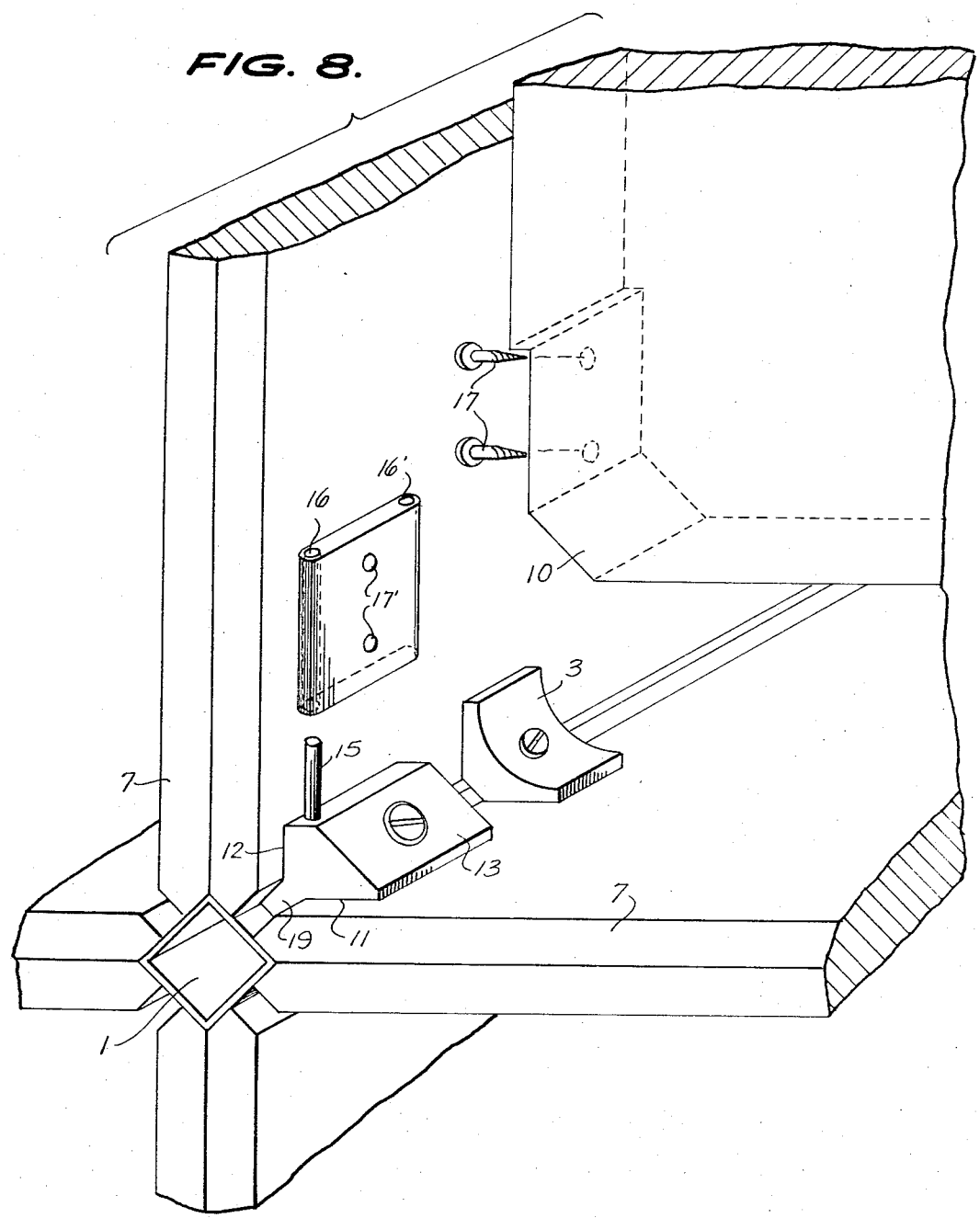
FIGURE 8 is an exploded axonometrical view of the elements of the hinge applied to the panels of compound furniture.
Figure 9:
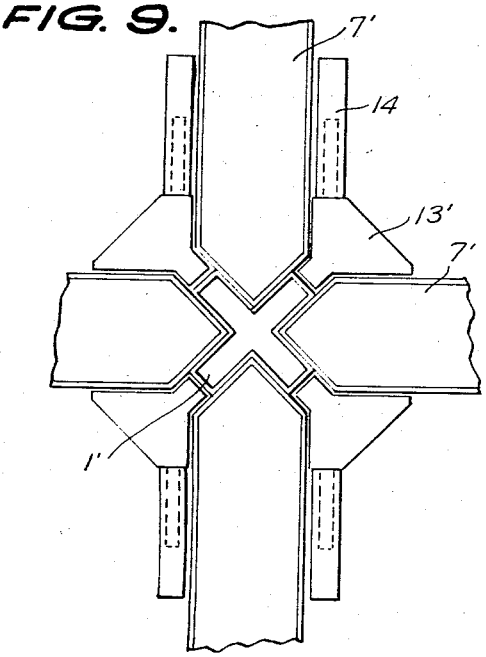
FIGURES 9, 10, 11, 12 represent diagrammatically applications to hinges of various types of joints according to the instant invention.

In the section of FIGURE 4 and in the exploded axonometry of FIGURE 8, there are shown the shapes of the fixed element 13 and the movable leaf 14 of a hinge designed for panels of furniture in accordance with the invention. The metallic prismatic element 13 has surfaces 12 and 11 located at a 90° angle which are designed to contact the ends of the panels, and the element is pierced by a bolt hole 18, the axis of which lies practically in the bisecting plane of the surfaces 12 and 11. A bolt or other frictional fastener is inserted in the hole which lies in the bisecting plane, of the hinge and extended into hole 2 in the joining element 1 of the panels 7 which is drilled in accordance with the point of application of the hinge.

The element 13 is provided with a guiding shank 19 for insuring angular alignment between right angular disposed panels and is provided with a pintle 15 around which the movable leaf 14 of the hinge turns. Leaf 14 comprises a metallic block provided with a pair of aligned bores or seats 16 and 16' into a selected one of which the pivot 15 is inserted, and is fixed to the movable panel 10 by means of screws 17, as shown in FIGURE 7.

Figure 5:
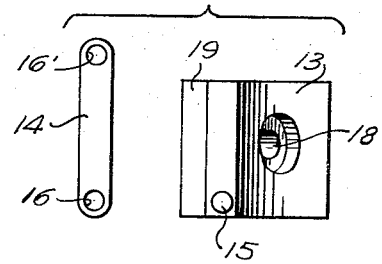
FIGURE 5 is an exploded plan view of the elements of FIGURE 4.
Figure 6:
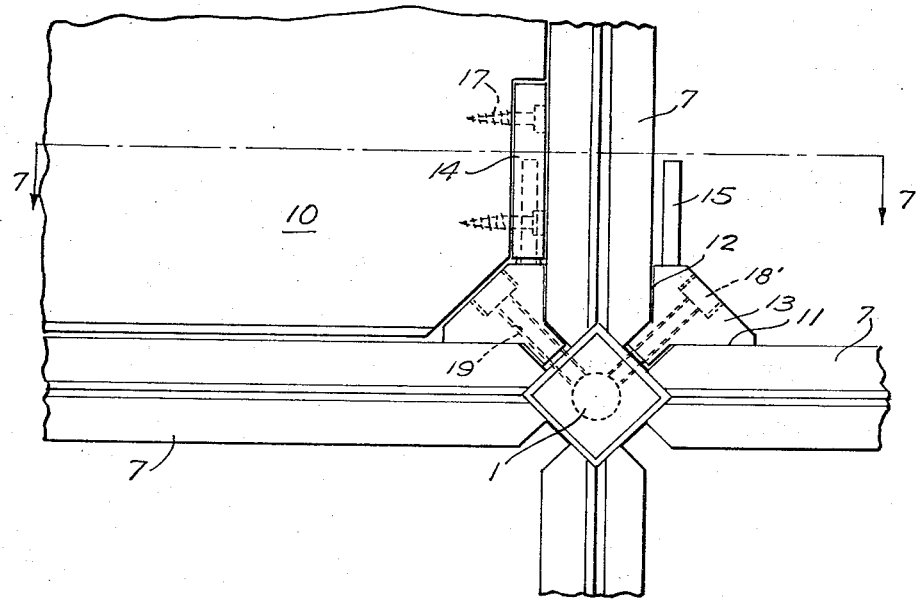
FIGURE 6 is a front view of the hinge of FIGURE 4 applied to the panels of compound furniture in accordance with the invention.

Elements 13 and 14 of the hinge are shown in plan in FIGURE 5 while FIGURE 6 discloses a compound furniture joint including a joining element 1 having four panels 7 connected thereto.

In the upper right-hand portion of FIGURE 6, fixed part 13 of the hinge provided with pivot 15 is shown as applied with the surfaces 12 and 11, seated against the panels between which the shank 19 is inserted. A connecting bolt (not shown) tightens the hinge 13 against square tube 1. In the upper left, in addition to the fixed hinge member 13, the movable hinge leaf 14 is shown fixed to the movable panel 10 by means of screws.

Figure 7:
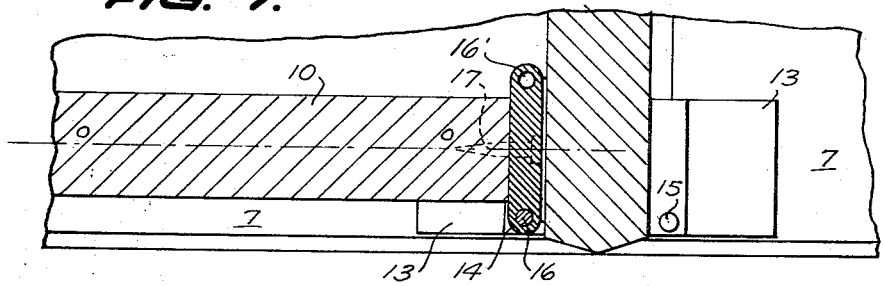
FIGURE 7 is a cross-sectional view on line VII—VII of FIGURE 6.

FIGURE 7 taken on line VII—VII of FIGURE 6, discloses the two divisions of the above described furniture.

In this figure the seat 16 of the movable element 14 accommodates fixed pivot 15 of the hinge, while the seat 16' (in symmetrical position in relation to the plane of symmetry 0—0 of the movable panel) is free. For lack of space, the upper hinge of the movable panel which is in a position corresponding to that shown for the lower one, does not appear in FIGURE 6, but the section of FIGURE 7 is adequate to illustrate how it is possible, by removing the movable panel from the pivots of its two hinges and turning it by 180° (around an axis lying in the said plane of symmetry) to reverse the panel faces. This is achieved by inserting the corresponding fixed pivots 15 of the hinges, in the previously open bores 16'.

The essential feature of the hinge applied to the panels of furniture according to the instant invention and emphasized in the figures of the drawings is found in the fact that the hinge is fixedly secured to the various joining elements, but not to the panels as with conventional hinges, and as the movable panels of the furniture have no part in the fixing operation, they therefore need not be altered or modified. In compound furniture according to fixed standards, this offers the advantage that the movable panels can be applied, removed, and replaced at will without interfering with the structure of the furniture proper.

Because of the characteristic of the double symmetrical seat of the movable leaf of the hinge, either surfaces of the shutter may be exposed at will, by means of a quick and simple operation which does not affect the structure of the basic furniture.

In accordance with the provisions of the patent statutes, I have shown and described my invention in its preferred embodiments of practical achievement, but I desire to have it understood that variations may be made in practice, without departing from the inventive concept.

Having now particularly described and ascertained the nature of my said invention and in what manner the same is to be performed, I declare that I claim:

1. A panel joint comprising an elongate support having a regular cross-sectional configuration, at least two panels, the edges of said panels mating with angularly related surfaces on said support and having at least one aperture in a side of each of said panels in proximity to said formed edge, at least one prismatic clamping element, said clamping element having two planar surfaces which if extended would intersect to form a dihedral, said planar surfaces engaging the adjacent sides of said panels and having a pin extending substantially perpendicularly from each of said surfaces and engaging an aperture in said sides of said panels, said clamping element being secured to said support by elongate fastener means passing substantially through the imaginary intersection of said surfaces thereby forcing the formed edge of the panel into fixed complementary comating relation to said support and causing the planar surfaces to hold the panels in fixed angular relation to each other.

2. The panel joint of claim 1 including
   a plurality of panels having an edge formed to complementarily comate with said support,
   a plurality of prismatic clamping elements each having two planer surfaces which if extended would intersect to form a dihedral, each of the planar surfaces resting against a side of a panel,
   a pin extending from each planar surface of the clamping element into an aperture in the panel against which the surface rests, and
   frictional fastening means for securing the clamping elements to the support thereby causing the pins which engage the apertures to hold the formed edge of the panel in complementary comating relation against the support and causing the planar surfaces to hold the panels in fixed angular relation to each other.

3. The panel joint of claim 2 wherein said support has a square cross-sectional configuration, and wherein each said panel edge is beveled inwardly and grooved centrally forming a W shaped cross-sectional configuration, said grooves engaging a corner of said square support.

4. The panel joint of claim 2 wherein said support has a cross-sectional configuration in the form of a cross and wherein the edge of each said panel is symmetrically beveled to form a point, said point being engaged by a recess between the arms of the cross shaped support.

5. The panel joint of claim 2 wherein the support has a circular cross-section and wherein said panels are beveled inwardly from each side and centrally grooved said groove being in form of an arc having substantially the same radius of curvature as the radius of said circular support, said arcuate groove engaging said support.

6. The panel joint of claim 2 wherein the support has a regular polygonal cross-sectional configuration formed by a plurality of equiangularly intersecting planes and wherein said panels include an edge at least a portion of which is flat and comates with one of said planes on said support.

7. The panel joint of claim 6 wherein said support has a regular octagonal cross-section.

8. The panel joint of claim 2 wherein said clamping element includes a flange having parallel sides extending from each of the planar surfaces, the center of said flange bisecting the dihedral which would be formed by the intersection of the two planar surfaces if extended.

9. The panel joint of claim 1 including a shutter hinge comprising at least one clamping element which includes a hinge pin extending from an additional surface in a direction parallel to one of the surfaces which rests against a panel side.

10. The panel joint of claim 9 including a shutter and at least one hinge pin receiver secured to said shutter, said hinge pin receiver comprising a block provided with two cylindrical seats for selectively receiving the hinge pin, said seats being parallel to an axis of the block and symmetrically spaced in proximity to opposite sides of said block whereby a first of said seats may selectively receive said hinge pin when the first side of said shutter is exposed and a second of said seats may selectively receive said hinge pin when said shutter is rotated 180° to expose a second side and whereby said shutter may pivot when said hinge pin is received by either cylindrical seat.

References Cited

FOREIGN PATENTS

| | | |
|---|---|---|
| 1,028,791 | 3/1953 | France. |
| 654,809 | 6/1951 | Great Britain. |
| 758,565 | 10/1956 | Great Britain. |

CARL W. TOMLIN, *Primary Examiner.*

R. S. BRITTS, *Assistant Examiner.*